Feb. 9, 1937.  F. H. SCHROEDER  2,069,972
SALMON LURE
Filed May 16, 1934
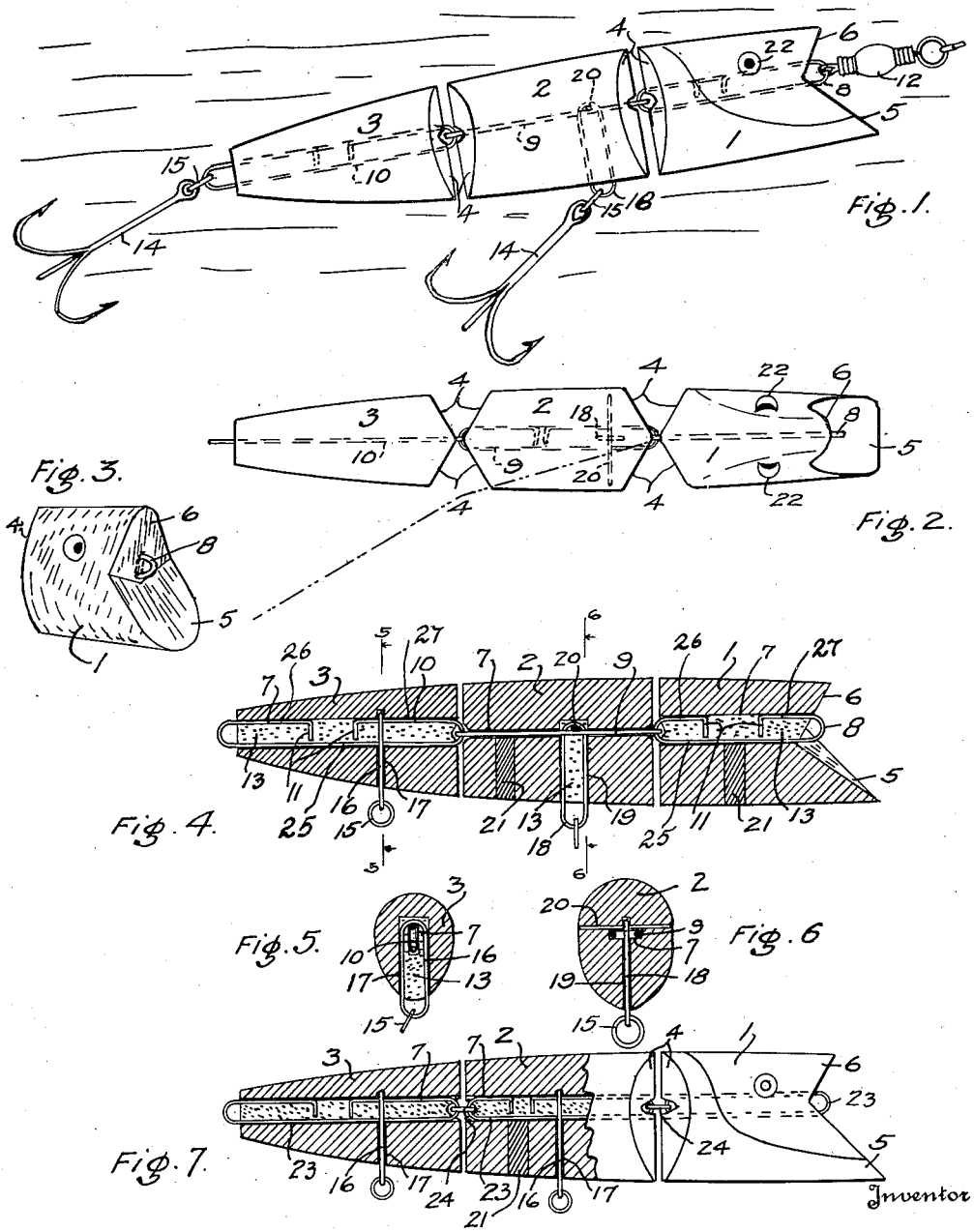
Inventor
Fred H. Schroeder Patented Feb. 9, 1937

2,069,972

UNITED STATES PATENT OFFICE 2,069,972

SALMON LURE

Fred H. Schroeder, Tacoma, Wash.

Application May 16, 1934, Serial No. 725,920

4 Claims. (Cl. 43—46)

This invention relates to salmon lures and has for its objects to provide a device which, first, simulates the appearance and action of a small fish as it is drawn through the water; second, which, though jointed, carries the strain of the hooked fish direct to the line by metallic connection without any of the stress passing through the lure itself; and, third, which is cheap to make and exceedingly effective in use.

I attain these and other objects as will be readily grasped from the following description, by the devices and arrangements illustrated in the accompanying drawing, in which—

Fig. 1 is an elevation of my lure, as it appears in use; Fig. 2 is a plan thereof; Fig. 3 is a perspective view of the head of the lure; Fig. 4 is a vertical longitudinal section thereof; Figs. 5 and 6 are cross-sections thereof taken on the lines 5—5 and 6—6 in Fig. 4, respectively; and Fig. 7 is an elevation, partly in section of a variation of my improved lure.

Similar numerals of reference refer to similar parts throughout the several views.

I am aware that other lures have been devised which simulate the form, and to a certain extent, the action of a small fish when drawn through the water, and that some of them have a continuous linkage from end to end, but so far as I am aware none has connected the linkage with the fish hook so that the strain of the hooked fish is carried direct to the fish line without passing through the body of the lure, in consequence of which said former lures are seriously defective since the fish is often able to pull the hook free of the lure, especially is this true in the case of the large and powerful salmon.

Referring to the drawing, it will be seen that my improved lure comprises a plurality of sections (three in the illustrations) in which the head 1 is linked to the front of the body 2, and the tail 3 is linked to the rear of said body 2. The form of each such section approximates the outline of the corresponding parts of a fish both in elevation and in section except that at the contiguous ends of each such section the parts are cut away at an angle on each side, as at 4, to permit lateral swinging of said part relative to the other parts and yet the centers of said parts are so close together that very little vertical swinging thereof is permitted. In this way the lure is permitted a perfectly natural action having a free lateral bending, increasing towards the tail, but substantially no vertical bending, as is the case with the natural fish. The head 1 is formed with the under jaw 5 extending beyond the upper jaw 6 and with the surface of the under jaw concaved.

Each section 1, 2 or 3 is provided with a longitudinal narrow slot 7, extending from end to end, located slightly above the center line of the section, and which is shown as having its major dimension vertical in the head 1 and the tail 3 (Fig. 4) and horizontal in the body 2. Three links 8, 9, and 10 lie in said slots 7, respectively, each link extending beyond the ends of its section very slightly and being formed preferably with its ends near the center of the link and turned at right-angles, as at 11, towards the opposite side of the link, to form a transverse intermediate bar, or bars, to said link. Each link, therefore, is made of a piece of wire whose central part 25 (Fig. 4) extends entirely through the section in which it lies, and whose ends 26 and 27 are bent back parallel to the part 25 to reenter the said slot 7 and to form the loops extending from the ends of each section 1, 2 or 3. The links are preferably made of wire and are not sealed closed. As stated above, the links extend very slightly out of the two ends of the respective fish section in which they lie, and interconnect with the adjacent links. In the case of the front end of the head link 8, the said end engages with the line swivel 12. Each section of the body of the lure is kept from movement on the link therein by means of a suitable cement 13 filling the slot 7 around the said link and its cross bars 11.

The fish hook 14 may be secured to the lure at any desired place, as at the tail 3 (Fig. 1) under the tail 3 (Fig. 4) or under the body 2 (Fig. 4). In the case of its being mounted to the rear of the tail 3, it is simply connected to the rear end of the link 10 by a ring 15 (Fig. 1). In the case of its being mounted under the tail 3, a link 16 is inserted upward in a suitable vertical slot 17 before the link 10 has been inserted in the tail 3, and then the link 10, in being inserted in the tail 3, is threaded through the said link 16 and holds it from being drawn out by the force of the hooked fish applied thereto. In the case of the hook being mounted under the body 2, in which the link 9 lies horizontally, a link 18 is inserted upward in the suitable narrow slot 19 (having its major dimension longitudinal), said link 18 passing between the members of the link 9 (Fig. 6) and is secured in place by a pin 20 extending across the body 2 and lying on top of the link 9, thus locking the said link 18 to the link 9 and preventing its being pulled out by the hooked fish.

If desired, suitable weights 21 may be inserted in the several parts of the lure as is found convenient.

The eyes 22 of the lure are cemented into the head 1 by suitable means, and are preferably made of glass.

In the variation of my invention illustrated in Fig. 7, the links 23 are all vertical in the several fish sections, and are attached together by means of very small rings 24, which are preferably either soldered or of the well-known split ring type.

Having described my invention, what I claim and desire to secure by Letters Patent, is—

1. A fish lure comprising a lure body composed of a series of separate sections, each of said sections having a slot extending from end to end thereof; and a series of interconnected wire links, each of said links comprising three parts embedded in cement within the slot of the corresponding section, one of said parts extending entirely through the section, the ends of the wire being bent back on itself outside the section, at each end thereof, to reenter the said slot and form the other two parts and to form loops into which the links of the other sections are interlinked.

2. A fish lure as set forth in claim 1, wherein the slots in said lure body sections are non-cylindrical in cross-section, and wherein the major transverse axes of consecutive slots lie in planes at right-angles to each other.

3. A fish lure comprising a lure body composed of a series of separate sections, each of said sections having a slot extending from end to end thereof; a series of interconnected wire links, each of said links comprising three parts embedded in cement within the slot of the corresponding section, one of said parts extending entirely through the section, the ends of the wire being bent back on itself outside the section, at each end thereof, to reenter the said slot and form the other two parts and to form loops into which the links of the other sections are interlinked; an independent loop link in threaded relation with one of said interconnected links and extending therefrom out of the lure body; a pin threaded through said independent link and engaging said interconnected link to lock said independent link in said lure; and a fish hook mounted on said independent link.

4. A fish lure as set forth in claim 1, wherein the inner ends of the wire link are bent at right-angles to lie across the link and across the axis of stress therein.

FRED H. SCHROEDER.